March 19, 1929.  A. G. RONNING ET AL  1,706,257
ROAD MACHINE
Filed Sept. 3, 1926   2 Sheets-Sheet 2

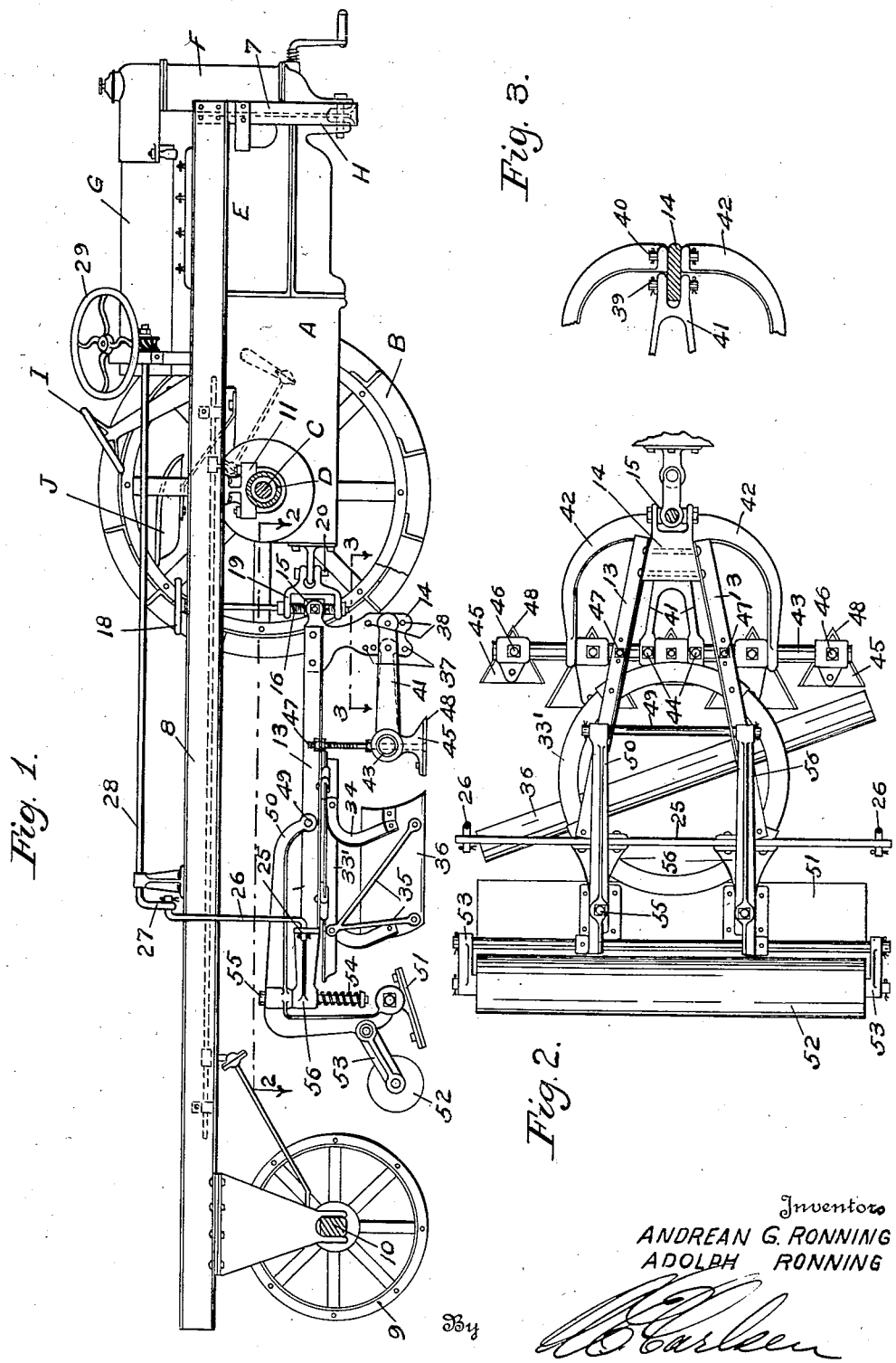

Inventors
ANDREAN G. RONNING
ADOLPH RONNING
By
Attorney

Patented Mar. 19, 1929.

1,706,257

UNITED STATES PATENT OFFICE.

ANDREAN G. RONNING AND ADOLPH RONNING, OF MINNEAPOLIS, MINNESOTA; JACOB A. RONNING AND ADOLPH RONNING EXECUTORS OF SAID ANDREAN G. RONNING, DECEASED.

ROAD MACHINE.

Application filed September 3, 1926. Serial No. 133,477.

This invention relates to road grading machinery and the primary object is to provide a tractor, of the well known Fordson type, with a supplemental frame which is attached to the tractor in such a manner as to be substituted for the normal fore-carriage of the tractor, and which carries a road working implement whereby the tractor, supplemental frame and the road working implement are all incorporated in a single, one-man operated machine, in such a manner that the operator is not only in a convenient position for operating the tractor and steering the machine, but is also able to effect various necessary adjustments to the implement which is carried by and positioned substantially under the supplemental frame. A further object is to provide a road working implement in the form of a secondary frame, which is adjustable in various respects from the operator's seat, and which directly carries the road working tools whereby said tools may be simultaneously and correspondingly adjusted. Further and more specific objects will be disclosed in the course of the following specification, reference being had to the accompanying drawings, in which:

Fig. 1 is a side elevation of the machine, with the rear wheels removed for purpose of illustration. This view shows the application of the supplemental frame, which extends rearwardly from the tractor proper.

Fig. 2 is a plan view of the road working implement, as seen on the line 2—2 in Fig. 1.
Fig. 3 is a sectional detail view on the line 3—3 in Fig. 4.

Figure 4:
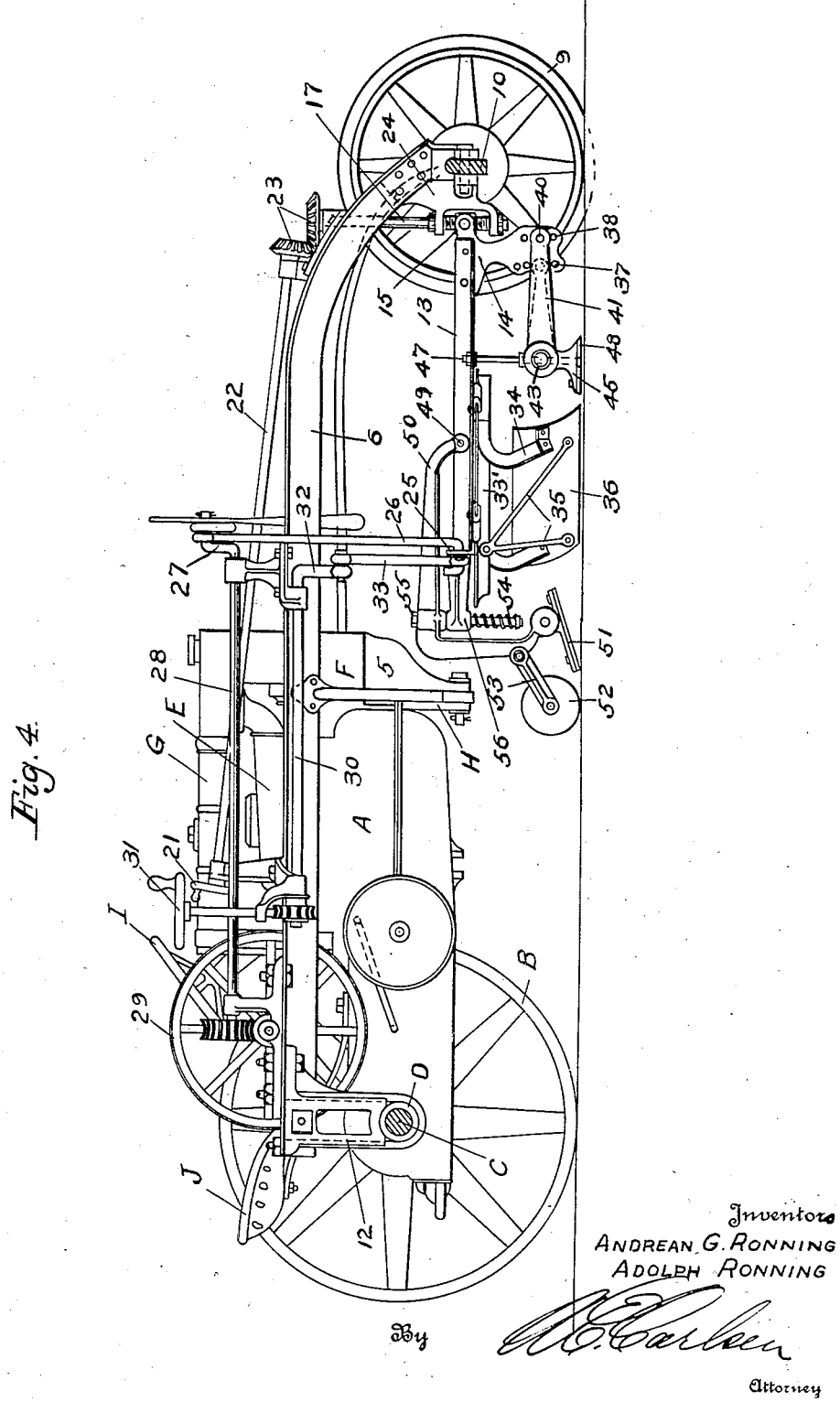
Fig. 4 is a side elevation of a modified form of the machine shown in Fig. 1, or with a supplemental frame in an advanced position with respect to the tractor.

It may here be noted that Figs. 1, 2 and 3 are very similar, in many respects, to the respective Figs. 6, 11 and 10, of our co-pending application Ser. No. 726,662, filed July 18, 1924, for road grader, and to the extent that subject matter of the present case is common to the application mentioned, the present case has continuity with said application. With respect to the construction shown in Fig. 4, attention is called to our co-pending application, Ser. No. 451,746, filed March 12, 1921, for traction implement, which shows a grader carried by a similar supplemental frame in advance of the tractor; and attention is also called to our co-pending applications Ser. No. 52,137 and Ser. No. 57,137, which are divisions of said application Ser. No. 451,746, and to our co-pending application Ser. No. 52,138 which is a division of our application Ser. No. 451,747, filed March 12, 1921, now Patent No. 1,556,549, all of which applications illustrate the idea of substituting a wheel supported frame for the normal steering carriage of the tractor.

Referring to Figs. 1 and 4 of the drawings A designates the main frame or body of a tractor having drive wheels B, rear axle C, axle housing D, engine E, radiator F, fuel tank G, front axle fork H, steering wheel I, and driver's support J, all of common construction in the well known Fordson type of tractor.

In converting the tractor into a one-man operable machine, in the manner more specifically recited in our above mentioned co-pending applications, the normal fore-carriage or steering carriage is entirely removed from the tractor, and the front end of the tractor is then supported by the yoke 5 of a forwardly extending frame 6, as shown in Fig. 4, or by the yoke 7 of a rearwardly extending frame 8, as shown in Fig. 1. The forward end of the frame 6 and the rearward end of the frame 8 are supported by wheels 9 having axles 10, which wheels and axles may be the removed tractor fore-carriage but may also be entirely different wheels and axles. The steering wheels, in their extended positions, may easily be connected with the usual steering apparatus already found on the tractor. In the machine shown in Fig. 1 the frame 8 is secured, as at 11, to the axle housing D, and steering is effected from the rear and the drivers B are in advance of the steering wheels, as well as the road working tools. In Fig. 4 the rear end of the frame 6 is secured, as at 12, to the axle housing D, and as the steering wheels 9 are in advance of both the tractor and the implement the operator is in an excellent position to observe and control the entire machine. In both Figs. 1 and 4, however, there is much in common. Thus, both frames 6 and 8 serve as substitutes for the normal, removed fore-carriage of the tractor, in both instances the normal wheel base of the tractor is extended, thus stabilizing the operation of the machine, the supplemental frames are secured in substantially the same manner, and the completed machines are substantially the same, except that one has the implement and steering carriage in advance of the tractor unit, while in the other such parts are in the rear.

The road working apparatus and the particular advantages of the construction will now be set forth.

An underslung grader frame is positioned under the main frame 6 (or 8), and substantially between the tractor unit proper and the steering wheels. It consists, primarily, of two rearwardly diverging, angle-iron draw bars 13, connected at their front ends by a casting 14, which is pivotally secured to a traveller 15 in which is threaded a shaft 16 (17, in Fig. 4). The shaft 16 (Fig. 1) has a hand wheel 18, which is within reach of the operator's station J, so that the front end of the frame 13 may be raised and lowered, at will. The shaft 16 is journaled in a yoke 19 pivotally secured, as at 20, to the rear end or draw bar of the tractor. The front end of the frame 13, as shown in Fig. 4 is raised and lowered by the turning of the shaft 17, which, in turn, is rotated by the hand wheel 21 (within reach of the operator) through medium of a shaft 22 and bevel gears 23. The shaft 17 is rotatably secured in a yoke portion of the casting 24 which unites the front ends of the frame (6) members.

The rear ends of the grader frame bars 13 are united by a transverse beam 25, the outer ends of which are carried by depending links 26, which in turn are suspended from cranks 27, of rods 28, which are controlled by hand wheels 29, in a well known manner, whereby the operator will have full control of the angular position of the frame 13—25, with respect to the road, at all times. In order that the operator may also adjust the lateral position of the grader frame, with respect to the main frame, we provide the right side of the frame 6 with a shaft 30, controlled by a wheel 31, and having a crank 32 which is connected to the left side of the frame beam 25, by a cross link 33. Thus, by turning the wheel 31 the operator may transversely swing the frame 13—25.

Secured under the frame 13—25, and rotatably adjustable with respect thereto, is a circular supporting member 33', known as a circle, and under it is secured, by brackets 34 and braces 35, the grader or scraper blade 36, so that the angle of the blade, with respect to the line of draft may be adjusted by turning the circle.

The lower portion of the casting 14 is provided with two sets of perforations 37 and 38, which selectively accommodate the pins 39 and 40 of a yoke 41 and a frame 42 of a scarifier. The yoke 41 is rigidly secured to a hollow shaft or pipe 43, by bolts 44, and the shaft, in turn, is journaled in the frame 42, so that the line of draft and the rotated position of the shaft 43 may be readily adjusted by replacing the pins 39 and 40, to the perforations 37 and 38, as may be required by the nature of the work to be done. The scarifier teeth 45 are secured to the pipe 43 by bolts 46, and the vertical adjustment of the scarifier, as well as its horizontal stability is affected by a pair of bolts 47, secured at their upper ends to the frame bars 13. The scarifier teeth 45 consist of wedge shaped castings having renewable triangular edged plates 48 secured to their bottom faces so that the hard surface of the road may be readily plowed up and disintegrated before being passed over and operated upon by the grader blade 36.

It will thus be seen that the row of scarifier teeth is always in a proper operating position, i. e., at right angles to the line of draft, regardless of the angular position of the grader blade; and that, as the scarifier is carried by the same frame (13) as the grader blade it will be simultaneously raised and lowered therewith when the operator manipulates the hand wheels 29 and 18 or 21. When the relative working depths of the scarifier and grader have once been properly adjusted they will remain substantially constant, regardless of further angular adjustments of the grader blade, with respect to the line of draft, or angular adjustments of the frame 13; and this we consider a very important and novel part of our invention.

A transverse bar 49 is mounted in the vertical flanges of the draw bars 13, and to it are pivotally connected the front ends of a pair of substantially L-shaped auxiliary draft beams 50, to the lower ends of which is adjustably secured a smoothing board 51. Rearwardly of the board 51 is a heavy roller 52, which is connected to the beams 50 by suitable means such as links 53. The members 50 are yieldingly pressed downwardly by springs 54, which are mounted on bolts 55 of the beams, and tend to spread the lower ends of the bolts downwardly away from rearwardly extending brackets 56, secured on the transverse beam 25. It may be noted that the smoothing and rolling members 51 and 52, like the scarifier, assume a constant transverse position regardless of adjustments to the grader blade or frame.

In surfacing or repairing a worn and rutted road the various parts are first adjusted to their best operative positions. As the machine now moves over the road the scarifier will first break up the uneven surface, especially the high parts or bumps in the road. The grader blade then fills in the hollows and evens up the road surface shifting the dirt from place to place. As the grader is followed by the smoothing and roller members 51 and 52 the road is left in a very good condition for vehicle traffic.

It is understood that suitable modifications may be made in the general design and structural details of the invention as herein shown and described, provided, however, that said modifications come within the spirit and scope of the appended claims.

Having now therefore fully shown and described our invention, what we claim to be new and desire to protect by Letters Patent is:

1. In a road grading machine, the combination with a frame adjustably carried by the machine, a road working tool pivotally attached to said frame, a scarifier attached to said frame, and means for adjusting the road working tool independently of the scarifier.

2. In a road grading machine, the combination with a frame, means for attaching a scarifier to said frame in fixed relation to the longitudinal axis of the machine, a road grading tool attached to said frame, and means for adjusting the angle of said tool about a vertical axis and with respect to the longitudinal axis of the machine.

3. In a road grading machine, the combination with a substantially horizontal frame adjustably carried under the machine, a scarifier, carried by the frame, a road grading tool carried by the frame rearwardly of the scarifier, said road grading tool being adjustable about a vertical axis independent of the scarifier.

4. In a road grading machine, the combination comprising a main frame, an adjustable frame associated therewith, a grader tool carried by the adjustable frame and adjustable with respect thereto about a vertical axis, and a scarifier in advance of the grader tool, said scarifier being carried by the adjustable frame and in fixed relation to the line of draft.

5. In a road grading machine, the combination with a frame adjustably carried under the machine, a grader blade carried by the frame and adjustable with respect to the line of draft, a scarifier carried by the frame in advance of the grader blade, said scarifier being mounted for vertical adjustment with respect to the frame.

6. In a road grading machine, the combination with a frame adjustably carried under the machine, a grader blade carried by the frame and adjustable with respect to the line of draft, a scarifier carried by the frame in advance of the grader blade, said scarifier being mounted for vertical adjustment with respect to the grader blade.

7. In a road grading machine, the combination with a frame adjustably carried under the machine, a grader tool and a scarifier carried by the frame, and separate means for independently and adjustably securing the grader tool and scarifier to the frame.

8. In a road grading machine, the combination with a frame, a grader tool and a scarifier carried by the frame, and separate means for independently and adjustably securing the grader tool and scarifier to the frame, and means for adjusting the frame to simultaneously and correspondingly adjust the grader tool and scarifier.

9. The combination with a tractor having its normal forecarriage removed, of a wheel supported frame serving as a substitute for the forecarriage, an implement frame arranged substantially under the first mentioned frame and adapted to be drawn therewith, and means extending to within reach of the operator of the tractor for raising and lowering the front end of the implement frame.

10. The combination with a normal tractor having its forecarriage removed, of a wheel supported frame secured to the tractor so as to support the front end thereof from whence the forecarriage has been removed, a grader frame carried under the first mentioned frame so as to be moved therewith, and a scarifier carried by the grader frame.

11. The combination with a normal tractor having its forecarriage removed, of a wheel supported frame secured to the tractor so as to support the front end thereof from whence the forecarriage has been removed, a grader frame carried under the first mentioned frame so as to be moved therewith, a grader blade carried by the grader frame and adjustable about a vertical axis with respect thereto, and a scarifier carried by the grader frame, in advance of the grader blade and independently adjustable with respect thereto.

12. The combination with a normal tractor having its forecarriage removed, of a wheel supported frame secured to the tractor so as to support the front end thereof from whence the forecarriage has been removed, a grader frame carried under the first mentioned frame so as to be moved therewith, and a scarifier carried by the grader frame, and means extending to within reach of the operator of the tractor, for adjusting the position of the front end of the grader frame.

13. The combination with a grader blade having a draft frame, of auxiliary draw bars pivotally secured to the frame and extending rearwardly thereof, a smoothing implement secured to the rear ends of the draw bars, and spring means for normally pressing said implement downwardly against the ground traversed by the grader blade.

14. The combination with a grader blade having a draft frame, of draw bars pivotally secured to the frame and extending rearwardly thereof, a smoothing implement secured to the rear ends of the draw bars, and a roller connected with the draw bars and operative upon the ground rearwardly of the smoothing implement.

15. The combination in a machine of the character described, of a scarifying device, a grader device, a smoothing device and a rolling device, arranged for respective operations on the ground over which the machine is moved, and means for simultaneously affecting vertical adjustments to all of the said devices.

16. In a machine of the character described, a scarifying device consisting of a draft member, a yoke and a frame adjustably secured with respect to the member, at their front ends, a transverse member connecting the rear ends of said yoke and frame, and earth engaging members secured to said transverse member.

In testimony whereof we affix our signatures.

ANDREAN G. RONNING.
ADOLPH RONNING.